Dec. 20, 1938.　　　　G. DEN BESTEN　　　　2,140,504
TRACTOR STOP HITCH WITH BRAKE
Filed June 29, 1936　　　2 Sheets-Sheet 1
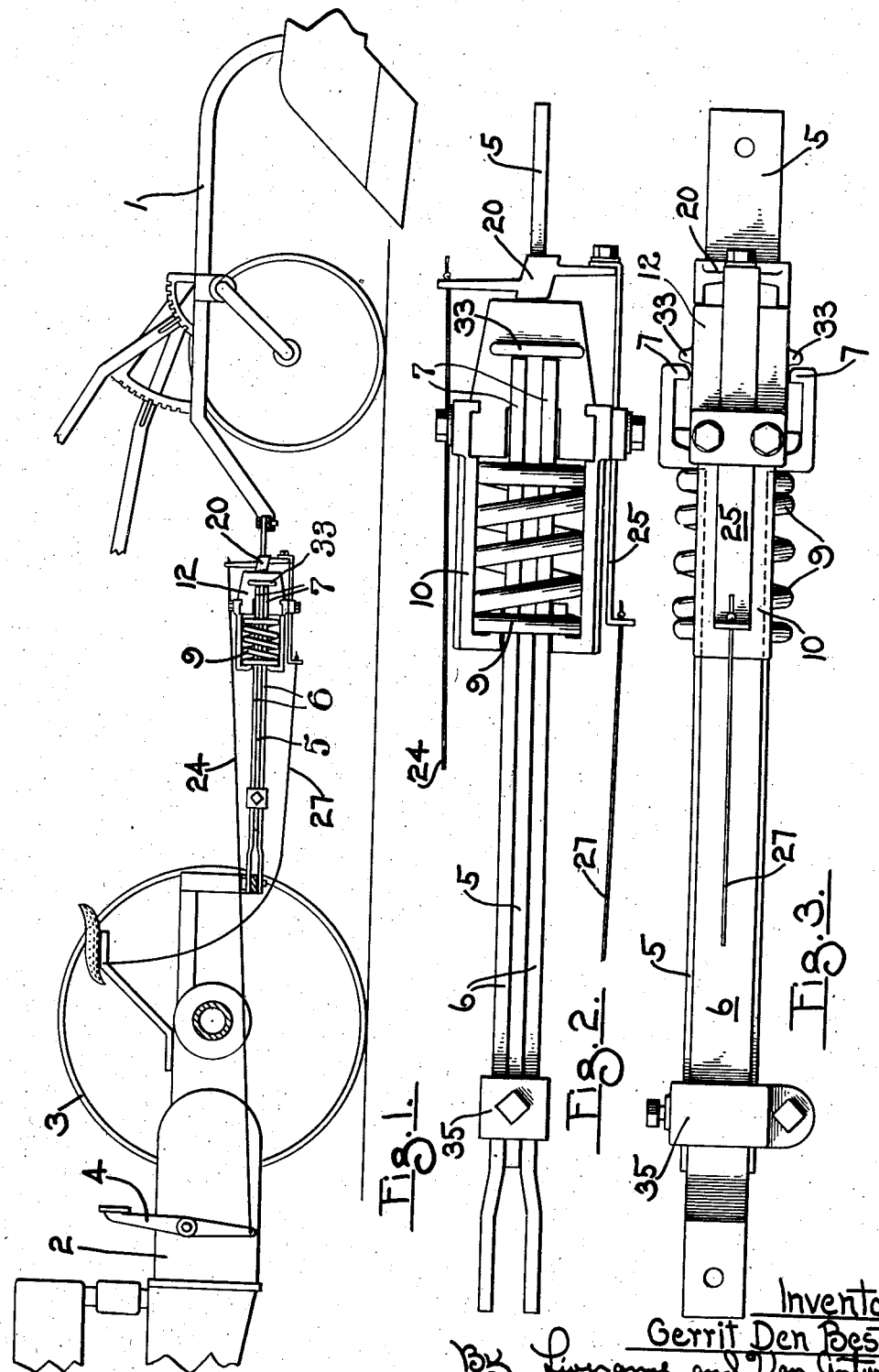

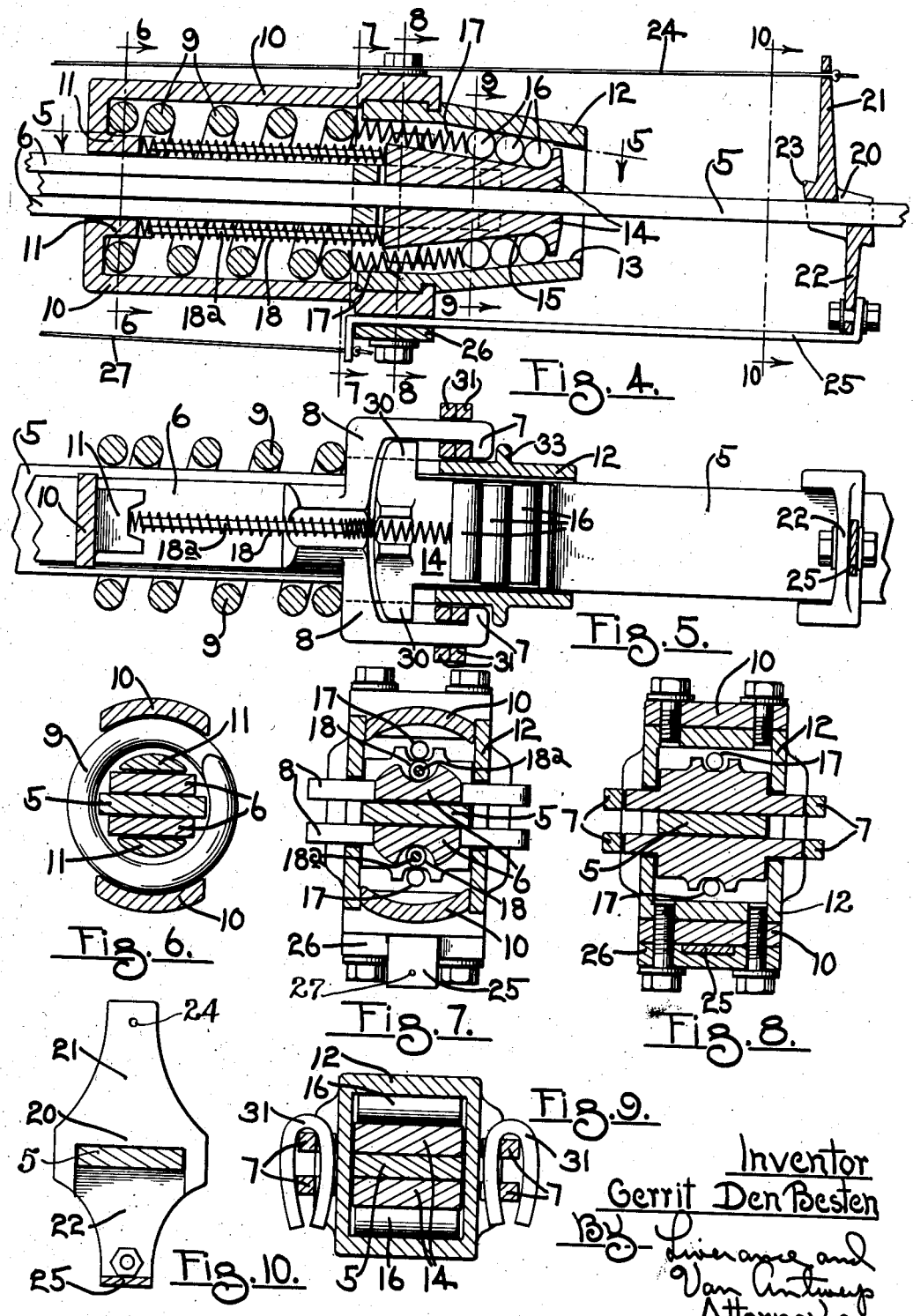

Patented Dec. 20, 1938

2,140,504

UNITED STATES PATENT OFFICE 2,140,504

TRACTOR STOP HITCH WITH BRAKE

Gerrit Den Besten, Corsica, S. Dak., assignor of one-fourth to Liverance & Van Antwerp, a copartnership composed of Frank E. Liverance, Jr., and Harold O. Van Antwerp, Grand Rapids, Mich.

Application June 29, 1936, Serial No. 87,832

18 Claims. (Cl. 180—14.5)

This invention relates to a tractor stop hitch which is that class of hitch which connects a tractor with a drawn implement and is extensible under abnormal load to permit the tractor to move away from the implement and at the same time automatically disengages the clutch of the tractor so that the tractor will stop.

One of the principal advantages of the present invention is to embody in the hitch structure means to resist forward movement of the tractor relative to the implement during the time that the hitch is being extended under abnormal load so that the tractor will stop quickly after its clutch has been disengaged.

Another object of the invention is extreme simplicity of structure combined with strength and positiveness in operation which minimizes cost and insures freedom from trouble to the operator.

Another object of the invention is substantially complete automatic operation both in extending the hitch under abnormal load and in resetting the hitch to normal position.

Another object is to provide means for adjusting the tension or amount of load which will be pulled by the hitch before it will extend.

The invention provides various novel features of construction and arrangement hereafter more fully described and particularly pointed out in the claims, reference being had to the accompanying drawings.

Fig. 1 is a diagrammatic elevation of a portion of a tractor and a portion of a drawn implement having the stop hitch embodying this invention connecting them.

Fig. 2 is a side elevation of the hitch.

Fig. 3 is an under plan view of the same.

Fig. 4 is an enlarged sectional elevation of the hitch with portions of the drawbars broken away.

Fig. 5 is a sectional plan view on the line 5—5 of Fig. 4, and

Figs. 6, 7, 8, 9 and 10 are respectively transverse sectional elevations on the lines 6—6, 7—7, 8—8, 9—9 and 10—10 of Fig. 4.

1 represents an implement such as a plow drawn by a tractor 2 which tractor is a conventional motor vehicle having a clutch to connect or disconnect the motor from the traction wheels 3 of the tractor, the clutch being engaged or disengaged by a lever 4 which may serve as a pedal.

The stop hitch has a central draw bar 5 which is attached to the implement 1 and a pair of outer draw bars 6 adjacent opposite sides of the central draw bar 5 and attached to the tractor 2.

The attachments of the respective draw bars to the implement and to the tractor being conventional and disconnectable but during operation of the stop hitch these connections are permanent.

The rear ends of the outside draw bars 6 terminate in outwardly and rearwardly extending hooks 7, the shoulders 8 of the hooks serving as seats for the rear end of a cushion spring 9 which surrounds the draw bars. The forward end of the spring 9 seats against housing members 10 which have prongs 11 extending into the spring to hold it in its proper place. The housing members 10 extend rearwardly and are connected to a clutch housing 12 having inclined clutch roller engaging surfaces 13 oppositely disposed relative to the draw bar 5.

Clutch shoes 14 are located on opposite sides and in contact with the draw bar 5 and have inclined clutch roller engaging surfaces 15 and clutch rollers 16 are interposed between said clutch surfaces 13 and 15. Clutch roller springs 17 engage the forward roller of each set and extend forwardly and seat against some fixed portion of the clutch such as the spring 9 and act to hold the clutch rollers in their proper operative positions. Clutch shoe springs 18 engage the forward ends of the clutch shoes 14 and also against some fixed portion of the clutch as the prongs 11 and yieldably hold the clutch shoes in their proper operative positions. Rods 18a are laid within the springs 18 to prevent their buckling.

From the foregoing it will be understood that the load pulled by the tractor is carried first through the outside draw bars 6, thence through the cushion spring 9 which engages the shoulders 8 of the hooks attached to the rear ends of the draw bars 6, thence through the housing members 10 and 12 and through the clutch rollers 16 and shoes 14 which by action of the inclined roller engaging surfaces are pressed tightly into frictional engagement with the draw bar 5 which in turn pulls the implement 1. So long as only the parts of the structure which have heretofore been described are operating the shoes 14 will tightly grip the draw bar 5 and no slippage or extension of the hitch will occur excepting such extension as occurs by compression of the cushion spring 9 which absorbs normal variations in the load.

A clutch throwout anchor 20 is mounted on the draw bar 5 behind the hitch body 12 and has two oppositely extending arms 21 and 22. The body of the anchor 20 has an opening through which the draw bar 5 passes and the shape of this opening is such that when forward pressure is exerted on the arm 21 the anchor will tilt and clamp itself upon the bar 5 but when forward pressure is exerted upon the oppositely extending arm 22 the anchor will tilt in the opposite direction and release and slide upon the bar. Rearward pressure on the upper side of the anchor will cause it to tilt to unclamped position on the bar 5 and a forwardly projecting shoulder 23 on the body of the anchor engages the rear end of the hitch body 12 so that the anchor will release and move rearwardly on the bar 5 when engaged on rearward movement of the hitch body 12.

A clutch cable 24 is attached to the outer end of the arm 21 of the anchor and extends to the clutch lever 4 of the tractor to which it is connected and is of the right length to just nicely span the distance between the clutch lever 4 when it is in position to engage the clutch and the anchor 20 when the hitch is in normal pulling position with the anchor 20 set immediately adjacent the rear end of the body 12.

A limit bar 25 is attached to the outer end of the arm 22 and passes through an opening on the hitch body which opening is enclosed on one side by a detachable plate 26. The forward end of the limit bar 25 is turned outwardly so that it will engage the plate 26 and limit movement of the hitch body relative to the anchor and when the hitch body has moved forwardly away from the anchor a predetermined distance, as hereafter described, the outturned end of the limit bar will engage the blade 26 exerting a forward pull on the arm 22 of the anchor tipping it and releasing its grip on the bar 5 and sliding it forward on the bar. A manual pull cable 27 is attached to the forward end of the limit bar 25 and extends to the proximity of the tractor operator, as to the seat thereof, where it may be conveniently reached and pulled by the operator to move the anchor forwardly for the purpose hereafter described.

The forward ends of the clutch shoes 14 are provided with outwardly extending ears 30 which lie in the paths of movements of the prongs of the hooks 7 and are engaged by said hooks and moved forwardly with the clutch shoes upon sufficient compression of the cushion spring 9 to cause such engagement. When the hooks 7 engage the ears 30 and move the shoes 14 forwardly the roller engaging surfaces 13 and 15 are separated sufficiently to release the clutch rollers 16 and ease the clamping action of the shoes 14 on the draw bar 5 permitting them to slip on the draw bar.

The hooks 7 may be provided with adjusting spacers 31 which straddle them and are for the purpose of adjusting the compression of the spring 9 necessary to engage the ears 30 with the hooks 7. The spacers 31 are interposed between the prongs of the hooks 7 and the ears 30 and when in use serve as forward extensions of the prongs 7. The hooks may be used without the spacers as illustrated in Fig. 3 or with the number of spacers desired, two being shown in Fig. 5. By adding spacers 31 the compression of the spring 9 to release the clutch shoes 14 is lessened.

*Operation*

The hitch is adjusted for normal pulling with its body 12 near the rear end of the draw bar 5 which is attached to the implement as illustrated in Fig. 1. This adjustment can be made manually before the hitch is connected to the implement or after the hitch is connected by backing the tractor relative to the implement which will slide the parts to the desired position. It is not important that the body 12 of the hitch be in any certain position relative to the draw bar 5 for forward pulling, but it should be sufficiently near the rear end of the draw bar to permit forward travel thereon upon extension of the hitch although for backing the implement the parts will move rearwardly until positively stopped as by engagement of the anchor 20 with the connection to the implement.

In this normal position the clutch throw out anchor 20 is immediately behind the body 12 of the hitch, it having automatically assumed this position by rearward movement of the hitch body on the draw bar 5. In this position the cable 24 extends from the arm 21 and is of sufficient length to permit the clutch lever 4 of the tractor to move to clutch engaging position.

In the normal positions above described the clutch shoes 14 are in close engagement with the draw bar 5 and forward pull by the tractor through the outer draw bars 6 the shoulders 8 of the hooks 7, the cushion spring 9 and the housing parts 10 and 12 cause the clutch rollers 16 to press the clutch shoes 14 into tight gripping engagement with the draw bar 5 sufficient to pull the implement 1 and these parts operate to pull the implement under normal conditions, normal variations in the load of the implement being absorbed by slight and normal compression of the spring 9, this normal compression being less than sufficient to engage the hooks 7 with the ears 30.

When the implement strikes an obstruction, such as the plow engaging a root or stone, and abnormal resistance is exerted by the implement the spring 9 will be compressed sufficiently to cause the hooks 7, or the adjusting spacers 31 thereon, to engage the ears 30 and move the clutch shoes 14 forwardly relative to the body portion 12 releasing the clutching action of the roller 16 sufficiently to permit the clutch shoes 14 to slip on the draw bar 5 and this slipping permits the clutch body and the outer draw bars 6 attached to the tractor to move forwardly on the draw bar 5 which action permits the implement to remain stationary while the tractor moves away from it.

However, it will be seen that this forward movement of the parts is under frictional engagement of the clutch shoes 14 with the draw bar 5 which resists the extension of the clutch and serves as a brake on the tractor. In other words, the clutch shoes 14 cannot be moved to a position to wholly release their grip on the draw bar 5 because it is the resistance to forward movement of the clutch shoes which causes spring 9 to be abnormally compressed resulting in the releasing movement of the shoes and if the shoes are completely released from their frictional engagement on the draw bar the spring 9 will immediately extend permitting the shoes to again rigidly grip the draw bar.

Therefore, the clutch shoes 14 are only released sufficiently to permit them to slip on the draw bar but still maintain sufficient frictional engagement and resistance to movement to cause the spring 9 to be abnormally compressed and it is under such frictional resistance that the parts are extended and the brake is applied to the tractor. The result of this action is that when an abnormal load is applied to the hitch sufficiently great to slip the clutch shoes 14 by action of the parts above described, this same abnormal load is maintained during the slipping and extending of the hitch.

When the clutch shoes 14 slip and the clutch body moves forwardly relative to the draw bar 5 the clutch throw out anchor 20 remains in its clamped position on the bar 5 and pulls on the cable 24 and when the tractor has moved forward a sufficient distance this cable 24 will have moved the clutch lever 4 sufficiently to disengage the clutch of the tractor thereby removing its driving connection and because of the braking pull caused by slipping the hitch parts the tractor will be stopped very quickly after its clutch has become disengaged.

The limit bar 25 is designed to permit movement of the parts amply to disengage the clutch of the tractor and if the tractor moves forwardly any appreciable distance after the clutch has been disengaged the outturned end on the limit bar 25 will engage the plate 26 and cause the anchor 20 to move forwardly with the clutch body.

It is assumed that after the foregoing has occurred the implement will be freed of its obstruction before attempting to again operate the tractor and when it is desired to again operate the tractor the operator releases the clutch throwout so that the clutch may be reengaged by manually pulling the cable 27 which pulls on the limit bar 25 and the arm 22 of the anchor tipping it to release it and slide it on the draw bar 5 to close proximity with the rear end of the clutch body which releases the cable 24 and permits movement of the clutch lever 4 to clutch engaging position.

This simple manual operation of pulling the clutch anchor forwardly close to the clutch body may be all that is necessary to put the device into normal operative condition because if the clutch has not been extended too great a distance it will again operate as previously described from the position in which it has been reset. However, if it is desired to put the clutch parts back into their normal position with the clutch body near the rear end of the draw bar 5 it is merely necessary to back the tractor which will slide all parts back to the position desired and they will automatically assume their operative positions without other operation or attention.

During the reverse movement of the parts above described the hooks 7 engage projections 33 on the body 12 pushing the body rearwardly which moves its inclined roller engaging faces 13 away from the clutch rollers 16 thus freeing the clutch shoes 14 so that they may slide on the bar 5 and the anchor 20 has its forward projection 23 engaged by the rear end of the body 12 which tips the anchor to release position so that it may also slide freely on the bar 5.

A safety stop 35 is rigidly fastened to the forward end of the draw bar 5 to prevent the hitch parts becoming disassembled in extending movement, the draw bars 6 sliding freely through it. If the hitch becomes abnormally extended the forward ends of the housing members 10 will engage the safety stop 35 which will prevent further extension and the tractor pulling on the bars 6 will be positively stopped although such stopping movement will be cushioned by the spring 9 inasmuch as the pull of the bars 6 to the housing is accomplished through said spring.

The invention is defined in the appended claims and is to be considered comprehensive of all forms of structure coming within their scope.

I claim:

1. A hitch of the class described comprising a pulling member and a pulled member movable relative to each other, means for transmitting a pulling load from the pulling member to the pulled member comprising friction clutch means engaging one of said members and connected to the other of said members through compressible cushion means, said clutch means acting to prevent relative movement of said members under normal load, means actuated under abnormal compression of said cushion means to partially release said clutch means to permit relative movement of said members, said releasing means also acting to maintain said clutch means in frictional engagement with its clutching member to exert resistance to such movement.

2. A hitch of the class described comprising a pulling member and a pulled member movable relative to each other, means for transmitting a pulling load from the pulling member to the pulled member comprising friction clutch means engaging one of said members and connected to the other of said members through compressible cushion means, said clutch means acting to prevent relative movement of said members under normal load, means actuated upon abnormal compression of said cushion means to partially release said clutch means to permit relative movement of said members, said releasing means also acting to maintain said clutch means in frictional engagement with its clutching member to exert resistance to such movement substantially equal to the abnormal load required to release said clutch.

3. A hitch of the class described comprising a pulling member and a pulled member, a friction clutch shoe engageable with one of said members, means including a compressible cushion member connecting said clutch shoe with the other of said members, means for moving said clutch shoe into clamping engagement with its engaging member and means actuated under abnormal compression of said cushion member to partially release the clamping engagement of said shoe with its engaging member to permit said members to move relative to each other, said releasing means becoming inoperative upon extension of said compression member.

4. The elements in combination defined in claim 3 combined with stop means fixed to said member engaged by said clutch shoe and engageable by a part of said connecting means associated with said cushion member.

5. A hitch of the class described comprising a pulling bar and a pulled bar located adjacent and movable relative to each other, a clutch shoe in frictional engagement with the pulled bar, means for forcing said shoe into said frictional engagement, means for connecting said shoe with said pulling bar comprising a compressible cushion member, releasing means connected to said pulling bar and engageable with said shoe upon abnormal compression of said cushion member to partially release the clamping engagement of said shoe, said releasing means becoming ineffective upon reexpansion of said cushion member.

6. A hitch of the class described comprising a pulling bar and a pulled bar located adjacent and movable relative to each other, a clutch shoe in frictional engagement with said pulled bar, a clutch housing, clutch engaging elements interposed between said shoe and said housing, acting to move said shoe into said frictional engagement upon movement in the pulling direction of said housing relative to said shoe, means comprising a cushion spring connecting said housing to said pulling bar and release means connected to said pulling bar and engageable with said shoe upon abnormal compression of said spring acting to move said shoe relative to said housing in a direction to release said frictional engagement.

7. The combination with a tractor having a power transmitting clutch of a hitch comprising a pulling member and a pulled member, said pulled member being attached to said tractor, and said members being movable relative to each other, friction means coacting between said members and serving to prevent relative movement of said members under normal load, means acting upon said friction means under abnormal load on said hitch to partially release said friction means to permit movement of said members relative to each other under considerable frictional resistance, a clutch releasing member frictionally attached to said pulled member, means connecting said clutch releasing member to said clutch on said tractor and means for moving said clutch releasing member relative to said pulled member after said pulling member has moved a predetermined distance relative to said pulled member.

8. The elements defined in claim 7 combined with manual means for moving said clutch releasing member on said pulled member toward said tractor.

9. A hitch of the class described comprising, a bar, a body movable longitudinally of said bar, friction devices acting to frictionally connect said body to said bar upon exertion of power in pulling direction and to release said body from said bar upon exertion of power in reverse direction, and means to cause said friction device to slip upon said bar under abnormal pulling load and at the same time to maintain strong braking resistance to such slipping movement throughout its length.

10. The elements defined in claim 9 in which said braking resistance maintained during slipping movement is substantially equal to the abnormal load required to cause the slipping movement.

11. A hitch of the class described comprising, a pulling member and a pulled member movable relative to each other, means for connecting said members together to prevent relative movement under normal load, said means yielding under abnormal load to permit relative movement of said members and means acting to apply a strong braking resistance to movement of said members relative to each other throughout the distance of their movement.

12. A hitch of the class described comprising, a pulling member and a pulled member movable relative to each other, friction means connecting said members together and preventing relative movement thereof under normal load said friction means being yieldable under abnormal load to permit relative movement of said members and said friction means acting to apply strong braking resistance to said relative movement during the extension of said parts.

13. The elements in combination defined in claim 12 in which said strong braking resistance is substantially equal to the abnormal load required to cause said members to move relative to each other.

14. The combination with a tractor having a power transmitting clutch and an implement drawn thereby, of a hitch comprising a pulling member attached to said tractor and a pulled member attached to said implement, said members being movable relative to each other, clutch means for connecting said members to prevent relative movement thereof under normal load, said clutch means being yieldable under abnormal load to permit relative movement of said members, means actuated by relative movement of said members to disengage said clutch, and means for applying braking resistance to relative movement of said members sufficient to stop movement of said tractor after disengagement of said clutch within the limit of relative movement of said members.

15. In combination with a tractor having a power transmitting clutch and an implement drawn thereby, of a hitch comprising a pulling member attached to said tractor and a pulled member attached to said implement, said members being movable relative to each other a predetermined distance, clutch means for connecting said members to prevent relative movement thereof under normal load, said clutch means being yieldable under abnormal load to permit relative movement of said members, means actuated by relative movement of said members during the first part of said predetermined distance to disengage said clutch, and means for applying braking resistance to relative movement of said members throughout all of said predetermined distance.

16. The elements in combination defined in claim 15 in which said braking resistance is sufficient to stop movement of said tractor after disengagement of said clutch within the predetermined distance of relative movement of said members.

17. A hitch of the class described comprising, a pulling member and a pulled member movable relative to each other, means for connecting said members together to prevent relative movement under normal load, said means yielding under abnormal load to permit relative movement of said members in an extending direction and means acting to apply a strong braking resistance to movement of said members in said extending direction, said braking means being releasable to permit unresisted movement of said members in a retracting direction.

18. A hitch of the class described comprising, a pulling member and a pulled member movable relative to each other, friction means for connecting said members together to prevent relative movement under normal load, said friction means yielding under abnormal load to permit relative movement of said members in an extending direction, said friction means acting to apply a strong braking resistance to movement of said members in said extending direction and said friction means being releaseable to permit unresisted movement of said members in a retracting direction.

GERRIT DEN BESTEN.